United States Patent
Rho et al.

(10) Patent No.: US 12,443,854 B2
(45) Date of Patent: Oct. 14, 2025

(54) REINFORCEMENT LEARNING DEVICE AND METHOD USING CONDITIONAL EPISODE CONFIGURATION

(71) Applicant: AGILESODA INC., Seoul (KR)

(72) Inventors: Cheol-Kyun Rho, Seoul (KR);
Seong-Ryeong Lee, Seoul (KR);
Ye-Rin Min, Namyangju-si (KR);
Pham-Tuyen Le, Suwon-si (KR)

(73) Assignee: AGILESODA INC., Seoul (KR)

( * ) Notice: Subject to any disclaimer, the term of this patent is extended or adjusted under 35 U.S.C. 154(b) by 573 days.

(21) Appl. No.: 17/926,277

(22) PCT Filed: Aug. 21, 2020

(86) PCT No.: PCT/KR2020/011169
§ 371 (c)(1),
(2) Date: Nov. 18, 2022

(87) PCT Pub. No.: WO2021/235603
PCT Pub. Date: Nov. 25, 2021

(65) Prior Publication Data
US 2023/0206079 A1 Jun. 29, 2023

(30) Foreign Application Priority Data
May 22, 2020 (KR) .................. 10-2020-0061890

(51) Int. Cl.
G06N 3/092 (2023.01)
(52) U.S. Cl.
CPC .................. *G06N 3/092* (2023.01)

(58) Field of Classification Search
CPC .................................................. G06N 3/092
See application file for complete search history.

(56) References Cited

U.S. PATENT DOCUMENTS

| | | | |
|---|---|---|---|
| 2018/0165603 A1* | 6/2018 | Van Seijen | G06N 3/045 |
| 2018/0348716 A1* | 12/2018 | Perez | G06N 3/006 |
| 2018/0356793 A1 | 12/2018 | Kanemaru | |
| 2019/0025803 A1* | 1/2019 | Akitomi | G05B 13/021 |
| 2019/0279081 A1* | 9/2019 | Pham | G06N 3/08 |
| 2020/0044909 A1* | 2/2020 | Huang | G06N 7/01 |

(Continued)

FOREIGN PATENT DOCUMENTS

| | | |
|---|---|---|
| KR | 10-2055141 B1 | 12/2019 |
| KR | 10-2079745 B1 | 4/2020 |
| KR | 10-2100688 B1 | 4/2020 |

OTHER PUBLICATIONS

Korean Office Action issued on Jul. 28, 2022 in corresponding Korean Patent Application No. 10-2020-0061890 (5 pages in Korean).

(Continued)

*Primary Examiner* — Christopher E Dunay
(74) *Attorney, Agent, or Firm* — NSIP Law

(57) ABSTRACT

Disclosed are a reinforcement learning device and method using a conditional episode configuration. The present invention imparts conditions on individual decision making, and terminates an episode if the imparted conditions are not met, thereby maximizing the total sum of rewards reflecting the current values. Accordingly, reinforcement learning can be easily applied even to problems using a non-continuous state.

9 Claims, 2 Drawing Sheets

(56) References Cited

U.S. PATENT DOCUMENTS

2020/0082275 A1    3/2020  Sun et al.
2020/0119556 A1*   4/2020  Shi ........................... G06N 3/08

OTHER PUBLICATIONS

International Written Opinion issued on Jan. 22, 2021 in counterpart Patent Application No. PCT/KR2020/011169 (3 pages in English).

* cited by examiner

REINFORCEMENT LEARNING DEVICE AND METHOD USING CONDITIONAL EPISODE CONFIGURATION

CROSS REFERENCE TO RELATED APPLICATIONS

This application is a U.S. National Stage Application of International Application No. PCT/KR2020/011169, filed on Aug. 21, 2020, which claims the benefit under 35 USC 119(a) and 365(b) of Korean Patent Application No. 10-2020-0061890, filed on May 22, 2020, in the Korean Intellectual Property Office, the entire disclosure of which is incorporated herein by reference for all purposes.

TECHNICAL FIELD

The disclosure relates to a reinforcement learning device and method using a conditional episode configuration and, more particularly to, a reinforcement learning device and method using a conditional episode configuration, which imparts conditions on individual decision making and terminates an episode, when the imparted conditions are not met, to maximize the total sum of rewards reflecting the current values so that reinforcement learning can be easily applied even to problems using a non-continuous state.

BACKGROUND ART

Reinforcement learning is a learning method that deals with agents that interact with the environment and achieve goals, and is widely used in robotics and artificial intelligence fields.

The purpose of such reinforcement learning is to find out what actions a reinforcement learning agent, that is, the subject of learning, need to take to get more rewards.

That is, the reinforcement learning is learning what to do to maximize rewards even when there is no fixed answer. The reinforcement learning goes through a process of learning to maximize rewards through trial and error, rather than listening to what action to take in advance in a situation where input and output have a clear relationship.

Further, the agent sequentially selects an action as the time step passes, and receives a reward based on the impact of the action on the environment.

FIG. 1 is a block diagram illustrating the configuration of a reinforcement learning device according to the prior art. As illustrated in FIG. 1, an agent 10 trains a method of determining an action (or behavior) A through learning of a reinforcement learning model, each action A affects the next state S, and the degree of success can be measured as a reward R.

That is, the reward is a reward score for an action (behavior) determined by the agent 10 according to a certain state when training is performed through the reinforcement learning model, and is a kind of feedback on the decision-making of the agent 10 according to learning.

An environment 20 is all rules such as actions that the agent 10 can take and rewards according to the actions, states, actions, rewards, etc., are all components of the environment, and all predetermined things other than the agent 10 are the environment.

Meanwhile, since substantial influence occurs on the learning result depending on how the reward is set, the agent 10 takes an action to maximize the future reward through reinforcement learning.

However, the reinforcement learning device according to the prior art has limitations in that the device should be used only in the direction of solving the number of cases for a clearly defined action in a given environment and achieving a goal of a predefined environment.

In other words, when the environment is clear, such as a game that is often applied in the reinforcement learning, the reward is confirmed as the game score. However, since the actual business environment is not like this, there is a problem in that rewards should be separately configured for reinforcement learning.

Further, the reinforcement learning device according to the prior art has a significant difficult problem in defining an episode for (non-continuous) data that cannot be clearly defined as the next state when a business problem is applied.

Here, the episode means a trajectory from the initial state to the last state. For example, in a game, the trajectory from "game start" to "game end" may be referred to as an episode.

More specifically, a trajectory until a character dies while the character repeats the transition to the next state after the character takes an action and completes one state can be called an episode. The episode at this time is the trajectory that collects the state, action, and reward process that the character took before the character dies.

However, in actual business, there is often no continuity between the corresponding state and the next state, and there is a problem that the agent cannot be trained unless the end state is defined separately because there is no fixed end state at this time.

Further, even if the end state is defined, even when finding the result of processing all N-step episodes from beginning to end, there is a problem that the more training is performed, the more time increases exponentially.

Further, if training is performed while the episode is maintained in batches in N steps without considering the relationship between the state and the reward, there may be cases where the agent takes an incorrect action due to overfitting when the agent takes an action in a new state.

DISCLOSURE OF INVENTION

Technical Problem

In order to solve this problem, the disclosure provides a reinforcement learning device and method using a conditional episode configuration, which imparts conditions on individual decision making and terminates an episode, when the imparted conditions are not met, to maximize the total sum of rewards reflecting the current values so that reinforcement learning can be easily applied even to problems using a non-continuous state.

Solution to Problem

In order to solve the above problems, a reinforcement learning device using a conditional episode configuration according to an embodiment of the disclosure may include: a conditional episode configuration unit configured to extract a plurality of N(≤W) states through sampling from an arbitrary data set in which W units of state exist, to configure a condition in which an episode ends for arbitrary T(≤N) states among the extracted states, and to configure an episode defined by T steps in which the condition is configured to provide the configured episode to an agent; and a reinforcement learning agent configured to determine an action so that the sum of rewards obtained in the T steps is maximized based on the episode.

Further, the episode according to the embodiment may configure an end time of the episode through a condition for the state, action, and reward in the T steps, and the end time of the episode may be any one of an erroneous prediction, exceeding a specific threshold, and a small reward value of a current stage.

Further, the conditional episode configuration unit according to the embodiment may include: a sampling unit configured to extract a plurality of states through sampling from an arbitrary data set; a condition configuration unit configured to configure a condition in which an episode ends for arbitrary T states among the extracted states, wherein N is less than or equal to the number of extracted plurality of states; and an episode configuration unit configured to configure an episode defined by T steps in which the condition is configured.

Further, the reinforcement learning agent according to the embodiment may perform reinforcement learning in a direction in which the sum of the currently valued rewards is maximized until the end time of the episode.

Further, the direction in which the sum of the rewards is maximized according to the embodiment may be a direction in which a policy gradient for an objective function of reinforcement learning increases cumulative rewards, and may be defined by the following Equation.

$$\nabla_\theta J(\pi) = \sum_{t=0}^{T-1} \nabla_\theta \log \pi(a_t \mid s_t, \theta) \times G(H)$$

Here, $\nabla_\theta J(\pi)$ denotes the policy gradient, $\pi$ denotes a policy that can give the greatest reward, $\theta$ denotes a coefficient (or a model parameter) of a neural net, T denotes the number of steps for which the condition is configured, $a_t$ denotes an action, $s_t$ denotes a state, and G(H) denotes the sum of currently valued rewards in one episode.

Further, a reinforcement learning method using a conditional episode configuration according to an embodiment of the disclosure may include: a) extracting, by a conditional episode configuration unit, a plurality of N(≤W) states through sampling from an arbitrary data set in which W units of state exist; b) configuring, by the conditional episode configuration unit, a condition in which an episode ends for arbitrary T(≤N) states among the extracted states; c) configuring, by the conditional episode configuration unit, an episode defined by T steps in which a condition is configured; and d) performing training and determining, by a reinforcement learning agent, an action so that the sum of rewards obtained in the T steps is maximized based on the configured episode.

Further, in the b) configuring, the conditional episode configuration unit according to the embodiment may configure any one of an erroneous prediction, exceeding a specific threshold, and a small reward value of a current stage as an end time of the episode through a condition for the state, action, and reward in the T steps.

Further, in the d) performing training, the reinforcement learning agent according to the embodiment may perform training in a direction in which the sum of the currently valued rewards is maximized until the end time of the episode.

Further, the direction in which the sum of the rewards is maximized according to the embodiment may be a direction in which a policy gradient for an objective function of reinforcement learning increases cumulative rewards, and may be defined by the following Equation.

$$\nabla_\theta J(\pi) = \sum_{t=0}^{T-1} \nabla_\theta \log \pi(a_t \mid s_t, \theta) \times G(H)$$

Here, $\nabla_\theta J(\pi)$ denotes the policy gradient, $\pi$ denotes a policy that can give the greatest reward, A denotes a coefficient (or a model parameter) of a neural net, T denotes the number of steps for which the condition is configured, at denotes an action, $s_t$ denotes a state, and G(H) denotes the sum of currently valued rewards in one episode.

Advantages Effects of Invention

As described above, according to the disclosure, it is possible to impart conditions on individual decision-making and to terminate an episode if the imparted conditions are not met, thereby maximizing the total sum of rewards reflecting the current values. Accordingly, reinforcement learning can be easily applied even to problems using a non-continuous state.

Further, according to the disclosure, it is possible to configure an episode for (non-continuous) data that cannot be clearly defined as the next state so that, if conditions given in the field of business decision-making such as cards and loans are not satisfied, unintentional reinforcement learning can be prevented by blocking training in another direction.

Further, according to the disclosure, it is possible to define an episode by a condition to determine a currently valued range in a process of calculating rewards, and to automatically define an episode until a corresponding condition is satisfied within N sampled states, that is, when the condition is not satisfied, thereby controlling training in a user's desired direction through the end of the episode and the condition.

Further, according to the disclosure, the initial state of the reinforcement learning agent in an episode may be randomly sampled, and the interaction proceeds until the environment meets the condition, thereby maximizing the total reward prediction value per episode and achieving a high level of performance in as few episodes as possible.

BEST MODE FOR CARRYING OUT THE INVENTION

Figure 1:
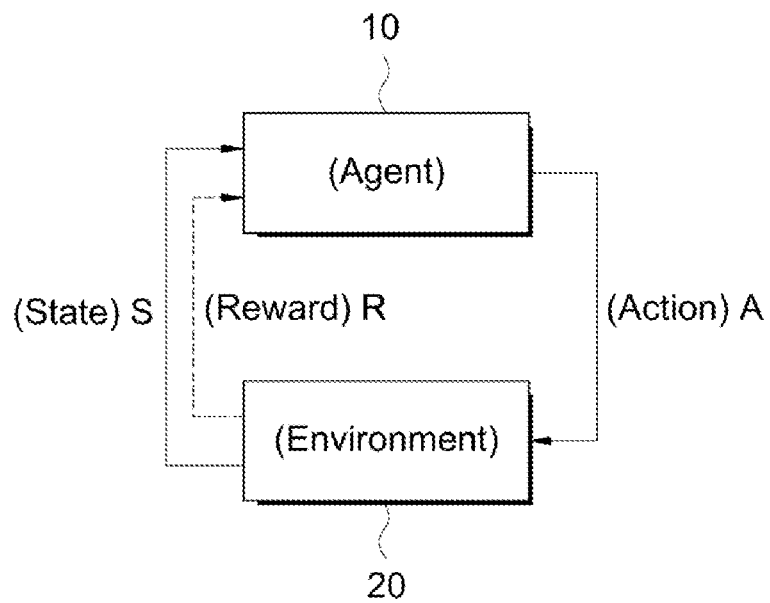
FIG. 1 is a block diagram illustrating the configuration of a general reinforcement learning device.

Hereinafter, the disclosure will be described in detail with reference to a preferred embodiment of the disclosure and the accompanying drawings, and like reference numerals in the drawings refer to like elements.

Before describing the details for carrying out the present invention, it should be noted that configurations that are not directly related to the technical gist of the present invention are omitted within the scope of not distracting the technical gist of the present invention.

Further, the terms or word used in the specifications and claims should be understood as meaning and concept coincided with the technical idea of the disclosure based on the principle that the inventor can define the concept of the terms for explaining his invention in the best way.

Throughout the whole detailed description, when a predetermined component "includes" another component, the predetermined component does not exclude other components, but may further include other components unless otherwise indicated.

Further, the term of "-part", "-unit", or "-module", if used, means a unit capable of processing at least one function or operation, and can be realized in hardware, software, or the combination of the hardware and the software in the detailed description of the disclosure.

Further, the term "at least one" is defined as a term including the singular and the plural, and even if the term "at least one" does not exist, it is obvious that each element may exist in the singular or plural and means the singular or plural.

Further, each component is provided in singular or plural depending on the embodiment.

Hereinafter, a preferred embodiment of a reinforcement learning device and method using a conditional episode configuration according to an embodiment of the disclosure will be described in detail with reference to the accompanying drawings.

Figure 2:
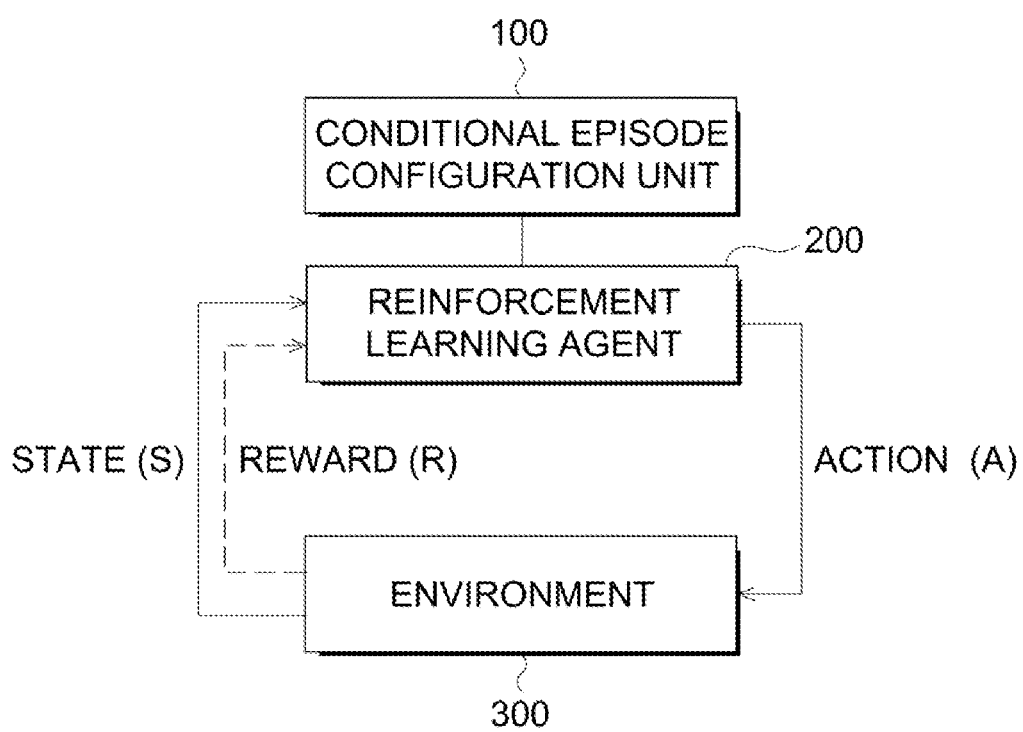
FIG. 2 is a block diagram schematically illustrating a reinforcement learning device using a conditional episode configuration according to an embodiment of the disclosure.
Figure 3:
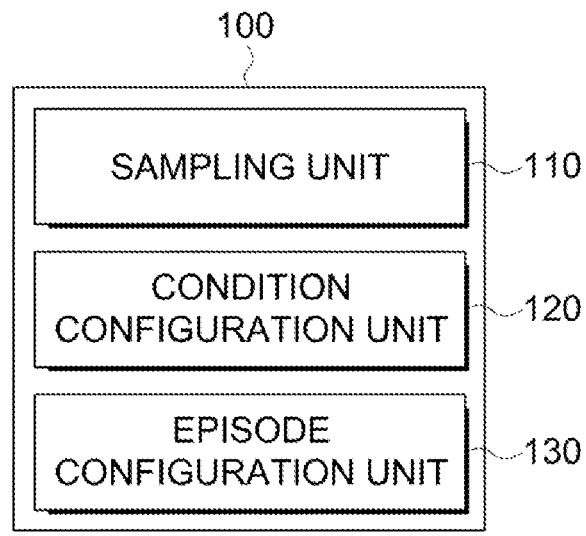
FIG. 3 is a block diagram illustrating the conditional configuration of the reinforcement learning device using the conditional episode configuration according to the embodiment of FIG. 2.

FIG. 2 is a block diagram schematically illustrating a reinforcement learning device using a conditional episode configuration according to an embodiment of the disclosure, and FIG. 3 is a block diagram illustrating the configuration of a reinforcement learning device using a conditional episode configuration according to an embodiment of the disclosure.

Referring to FIGS. 2 and 3, a reinforcement learning device using a conditional episode configuration according to an embodiment of the disclosure includes a conditional episode configuration unit 100 configured to impart conditions on individual decision-making and to terminate an episode when the imparted conditions are not met, to determine an action so that the total sum of rewards reflecting the current values is maximized, and a reinforcement learning agent 200.

The conditional episode configuration unit 100 is a component that configures conditions for T data sets in a data set consisting of arbitrary data, configures an episode defined by T steps in which the condition is configured, and provides the configured episode to the reinforcement learning agent 200, and includes a sampling unit 110, a condition configuration unit 120, and an episode configuration unit 130.

The sampling unit 110 is a component that extracts a plurality of N states through sampling from a data set, for example, a set of various data in which W units of state exist, such as financial fraud data, card duplicate payment data, loss rate data, yield data, limit exhaustion rate data, etc., and randomly extracts a certain number of states.

Here, the number of extracted states "N" may be configured to be less than or equal to "W" (N≤W).

The condition configuration unit 120 selects T states from among the plurality of states extracted by the sampling unit 110, and configures an arbitrary condition in which a corresponding episode for the selected T states ends.

Further, the condition configuration unit 120 may configure the number of T states according to a predetermined number or a user's configuration.

Further, the number of "T" selected states may be configured to be the same number (T≤N) than or equal to the number "N" of the plurality of states extracted from the sampling unit 110.

Here, the condition configuration unit 120 may configure, in the case of a classification problem, a condition for terminating the episode when an incorrect prediction is made, a condition for terminating the episode when exceeding a specific threshold, as a condition related to the termination of the episode.

Further, the condition configuration unit 120 may configure a condition for terminating the episode when the reward value in the current step is small.

That is, the condition configuration unit 120 may configure the end time of the episode through a predetermined condition, and the end time of the episode may be variously configured, such as an incorrect prediction, exceeding a specific threshold, and a small reward value of the current step.

The episode configuration unit 130 configures a temporary episode based on the episode defined by the T steps in which the condition for terminating the episode in the condition configuration unit 120 is configured, and then extracts a step in which the condition is met among steps of the temporary episode through training or learning of the reinforcement learning agent 200 to configure the episode.

That is, when the episode configuration unit 130 defines the episode by the condition of the condition configuration unit 120, a currently valued range is determined until the reward is calculated, so that the episode can be changed flexibly.

Therefore, the episode configuration unit 130 configures the episode constituted of the T steps in the condition configuration unit 120 as the temporary episode, provides the configured episode to the reinforcement learning agent 200, and performs training or learning of the reinforcement learning agent 200 to automatically define and reconfigure the episode so that, when the episode is terminated through the condition for the state, action, and reward among the T steps, the sum of the rewards can be maximized based on the step where training is performed well by satisfying the condition.

By using the episode configuration of the episode configuration unit 130 through such condition configuration, the user can train and learn in a desired direction to exclude learning in an unnecessary direction.

The reinforcement learning agent 200 performs reinforcement learning based on the episode input from the conditional episode configuration unit 100 in a state where an arbitrary reinforcement learning model is installed, and determines an action so that the sum of the rewards obtained from the T steps can be maximized through reinforcement learning.

That is, the reinforcement learning agent 200 performs learning based on the provided episode in a direction that maximizes the sum of the currently valued rewards until the end of the episode.

In more specifically, for example, 100 steps are extracted through sampling, and if an arbitrary condition for terminating an episode is configured for the extracted 100 steps, an episode defined as T=100 steps may be configured.

Next, when an arbitrary step does not satisfy the condition in the process where the reinforcement learning agent 200 performs learning, the learning is terminated and the learning content up to that point is reflected and updated, and the updated agent will learn the next episode.

Here, when, for example, only 60% is satisfied and learning is terminated through the configured condition, the agent performs learning in a direction in which the learning is improved to satisfy the remaining 40%, that is, in a direction in which the total sum of rewards is maximized.

Accordingly, when the number of extracted sampling is configured to be the number of T steps in which a predetermined condition is configured, and when learning is performed well and goes to T, the reward can be maximized.

Meanwhile, the direction in which the total sum of rewards is maximized is a direction in which a policy gradient for an objective function of reinforcement learning increases cumulative rewards, and may be defined by the following Equation.

$$\nabla_\theta J(\pi) = \sum_{t=0}^{T-1} \nabla_\theta \log \pi(a_t \mid s_t, \theta) \times G(H)$$

Here, $\nabla_\theta J(\pi)$ denotes the policy gradient, $\pi$ denotes a policy that can give the greatest reward, $\theta$ denotes a coefficient (or a model parameter) of a neural net, T denotes the number of steps for which the condition is configured, $a_t$ denotes an action, $s_t$ denotes a state, and G(H) denotes the total sum of currently valued rewards in one episode.

Further, the reward is the sum of the rewards obtained from the T steps in the episode.

Further, compensation function Gt=R($s_t$, $a_t$)+⌈R($s_{t+1}$, $a_{t+1}$)+⌈$^2$R($s_{t+2}$, $a_{t+2}$)+ . . . +⌈$^T$R($s_T$, $a_T$), and ⌈$_\in$[0, 1].

Here, ⌈ is a coefficient related to the current value of rewards, and the closer to 0, the more important the compensation of the present decision step than the future, and the closer to 1, the more important all the decision step rewards are given the same weight.

Hereinafter, a reinforcement learning method using a conditional episode configuration according to an embodiment of the disclosure will be described.

Figure 4:
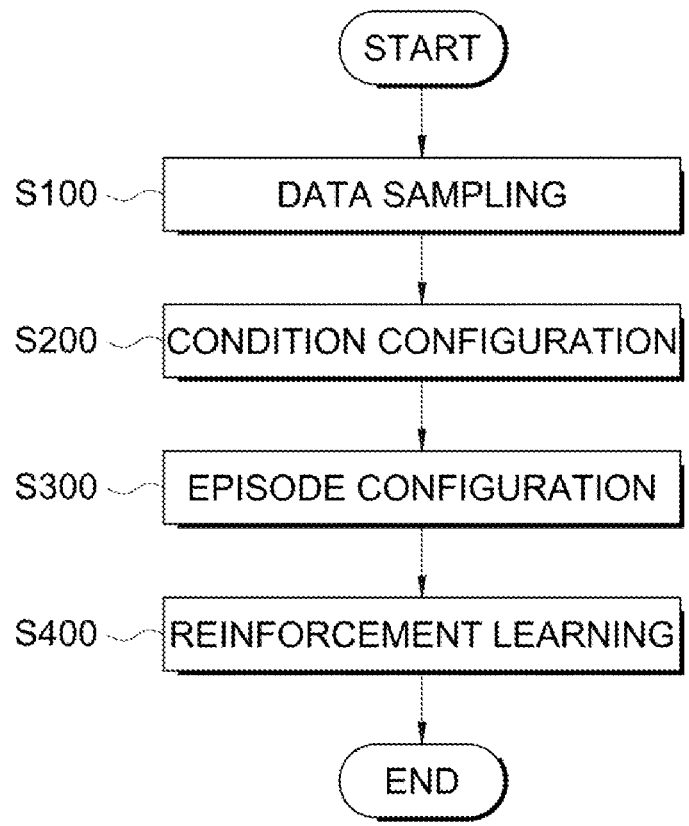
FIG. 4 is a flow chart illustrating a learning method of the reinforcement learning apparatus using a conditional episode configuration according to an embodiment of the disclosure.

FIG. 4 is a flow chart illustrating a learning method of the reinforcement learning apparatus using a conditional episode configuration according to an embodiment of the disclosure.

Referring to FIGS. 2 to 4, in operation S100, the conditional episode configuration unit 100 extracts a plurality of pieces of state data through sampling from an arbitrary data set.

In operation S100, the conditional episode configuration unit 100 randomly extracts a plurality of N states through sampling from a set of various data in which W units of state exist.

Here, the number of extracted states "N" may be configured to be less than or equal to "W" (N≤W).

In operation S200, the conditional episode configuration unit 100 selects arbitrary T states from among the plurality of states extracted in operation S100, and configures a condition for the selected T states.

Further, in operation S200, the conditional episode configuration unit 100 may configure the number of T states according to a predetermined number or a user's configuration.

Further, in operation S200, the conditional episode configuration unit 100 may configure the number of "T" selected states to be the same number (T≤N) than or equal to the number "N" of the plurality of states extracted in operation S100.

Further, in operation S200, the conditional episode configuration unit 100 may configure, in the case of a classification problem, a condition for terminating the episode when an incorrect prediction is made, a condition for terminating the episode when exceeding a specific threshold, as a condition related to the termination of the episode.

Further, when the reward value in the current step is small, a condition for terminating the episode may be variously configured.

Subsequently, in operation S300, the conditional episode configuration unit 100 may configure an episode defined by the T steps in which a condition for terminating the episode is configured.

Further, in operation S300, the conditional episode configuration unit 100 may configure a temporary episode based on the episode defined by the T steps in which the condition for terminating the episode is configured, and then may extract a step in which the condition is met among steps of the temporary episode through training or learning of the reinforcement learning agent 200 to configure the episode.

That is, in operation S300, when the conditional episode configuration unit 100 defines the episode by the condition, a currently valued range is determined until the reward is calculated, so that the episode can be changed flexibly. Accordingly, the episode constituted of T steps may be configured as the temporary episode and may be provided to the reinforcement learning agent 200.

Further, in operation S300, the conditional episode configuration unit 100 performs training or learning of the reinforcement learning agent 200 to automatically define and reconfigure the episode so that, when the episode is terminated through the condition for the state, action, and reward among the T steps, the sum of the rewards can be maximized based on the step where training is performed well by satisfying the condition.

Further, the episode configured in operation S300 may be provided to the reinforcement learning agent 200, and the reinforcement learning agent 200 performs reinforcement learning in operation S400 to determine an action so that the sum of the rewards obtained from the T steps can be maximized through reinforcement learning.

Further, in operation S400, the reinforcement learning agent 200 performs learning in a direction in which the total sum of the currently valued rewards up to the end time of the episode is maximized, and the direction in which the total sum of rewards is maximized is a direction in which a policy gradient for an objective function of reinforcement learning increases cumulative rewards, and may be defined by the following Equation.

$$\nabla_\theta J(\pi) = \sum_{t=0}^{T-1} \nabla_\theta \log \pi(a_t \mid s_t, \theta) \times G(H)$$

Here, $\nabla_\theta J(\pi)$ denotes the policy gradient, $\pi$ denotes a policy that can give the greatest reward, $\theta$ denotes a coefficient (or a model parameter) of a neural net, T denotes the number of steps for which the condition is configured, $a_t$ denotes an action, $s_t$ denotes a state, and G(H) denotes the sum of currently valued rewards in one episode.

Further, the reward is the sum of the rewards obtained from the T steps in the episode. Further, compensation function Gt=R($s_t$, $a_t$)+⌈R($s_{t+1}$, $a_{t+1}$)+⌈$^2$R($s_{t+2}$, $a_{t+1}$)+ . . . +⌈$^T$R($s_T$, $a_T$), and ⌈$_\in$[0, 1].

Here, ⌈ is a coefficient related to the current value of rewards, and the closer to 0, the more important the compensation of the present decision step than the future, and the closer to 1, the more important all the decision step rewards are given the same weight.

The following table shows the results of performance tests for each episode definition using actual credit card transaction data including 22% fraudulent transactions published by UCI (University of California).

In the experiment, Table 1 is a performance comparison table that measures F-1 measurement, reward, and loss amount.

Further, an episode was defined as an episode ending condition until the reinforcement learning agent took an erroneous action with respect to a fraud case by composing an episode based on a specific condition.

That is, supervised learning (SL) means supervised learning, one-step means one-step method, N-step means N-step method using the entire batch size as an episode, and false negative (FN) was defined as one episode until the reinforcement learning agent took a wrong action in the case of fraud in the step in which the condition was configured.

TABLE 1

| Episode definition | F1 | rewards | cost(million) |
|---|---|---|---|
| SL | 0.450 | 0.315 | 140.0 |
| One-step, $\gamma = 0.0$ | 0.516 | 0.512 | 100.0 |
| One-step, $\gamma = 0.5$ | 0.517 | 0.527 | 95.0 |
| One-step, $\gamma = 0.9$ | 0.519 | 0.535 | 92.2 |
| One-step, $\gamma = 0.99$ | 0.516 | 0.508 | 101.3 |
| N-step, $\gamma = 0.0$ | 0.519 | 0.529 | 94.2 |
| N-step, $\gamma = 0.5$ | 0.515 | 0.507 | 102.3 |
| N-step, $\gamma = 0.9$ | 0.519 | 0.519 | 97.8 |
| N-step, $\gamma = 0.99$ | 0.519 | 0.538 | 92.2 |
| FALSE, $\gamma = 0.0$ | 0.521 | 0.525 | 98.1 |
| FALSE, $\gamma = 0.5$ | 0.518 | 0.535 | 92.6 |
| FALSE, $\gamma = 0.9$ | 0.517 | 0.516 | 100.2 |
| FALSE, $\gamma = 0.99$ | 0.518 | 0.532 | 94.3 |
| FN, $\gamma = 0.0$ | 0.520 | 0.526 | 95.6 |
| FN, $\gamma = 0.5$ | 0.520 | 0.524 | 98.3 |
| FN, $\gamma = 0.9$ | 0.521 | 0.537 | 93.9 |
| FN, $\gamma = 0.99$ | 0.520 | 0.550 | 86.9 |

Here, numerical values corresponding to high performance are emphasized with bold numbers, and the lower the loss amount, the better the performance. As can be seen from Table above, the reinforcement learning agent shows good performance for FALSE, in which the reinforcement learning agent constitutes an episode under a certain condition, for example, must not be wrong even once, and for FN, in which an episode is configured on the condition that a fraud cannot be wrong even when it is not wrong even once. In particular, the FN episode experiment shows the best performance.

Therefore, it is possible to impart conditions on individual decision-making and to terminate an episode if the imparted conditions are not met, thereby maximizing the total sum of rewards reflecting the current values. Accordingly, reinforcement learning can be easily applied even to problems using a non-continuous state.

Further, it is possible to configure an episode for (non-continuous) data that cannot be clearly defined as the next state so that, if conditions given in the field of business decision-making such as cards and loans are not satisfied, unintentional reinforcement learning can be prevented by blocking training in another direction.

Further, it is possible to define an episode by a condition to determine a currently valued range in a process of calculating rewards, and to automatically define an episode until a corresponding condition is satisfied within N sampled states, that is, when the condition is not satisfied, thereby controlling training in a user's desired direction through the end of the episode and the condition.

Further, the initial state of the reinforcement learning agent in an episode may be randomly sampled, and the interaction proceeds until the environment meets the condition, thereby maximizing the total reward prediction value per episode and achieving a high level of performance in as few episodes as possible.

As described above, the disclosure has been described with reference to the preferred embodiment of the disclosure, but those skilled in the art can variously change the disclosure within the scope without departing from the spirit and scope of the disclosure described in the claims below.

Further, the reference numbers described in the claims of the present invention are only provided for clarity and convenience of description, and are not limited thereto, and in the process of describing the embodiment, the thickness of the lines or the size of the components shown in the drawings may be exaggerated for clarity and convenience of explanation.

The terms to be described below are terms defined in consideration of functions in the present invention, which may vary depending on the intention or custom of the user or operator. Therefore, the definition should be made based on the contents throughout the specification.

Further, even if not explicitly shown or described, those skilled in the art to which the present invention pertains various modifications, including the technical idea according to the present invention from the description of the present invention. Is obvious, and still belongs to the scope of the present invention.

The above embodiments described with reference to the accompanying drawings are described for the purpose of illustrating the present invention, and the scope of the present invention is not limited to these embodiments.

DESCRIPTION OF REFERENCE NUMERALS

100: Conditional episode configuration unit
110: Sampling unit
120: Condition configuration unit
130: Episode configuration unit
200: Reinforcement learning agent
300: Environment

The invention claimed is:

1. A reinforcement learning device using a conditional episode configuration, the reinforcement learning device comprising:
 a conditional episode configuration unit (100) configured to
  extract a plurality of N(≤W) states through sampling from an arbitrary data set in which W units of state exist,
 configure a condition in which an episode ends for arbitrary T(≤N) states among the extracted states,
 define an episode in the condition so that a currently valued range is determined and the episode is flexibly changed when rewards are calculated,
 configure a temporary episode based on the episode defined by T steps in which a condition for terminating the episode is configured, and provide the configured temporary episode to a reinforcement learning agent (200), and
 automatically define and reconfigure the episode so that, when the episode ends because the condition for the state, action, and reward is not satisfied among the T steps through training of the reinforcement learning agent (200) among the steps of the temporary episode, the sum of the rewards can be maximized based on the step so far where training is performed well by satisfying the condition; and the reinforcement learning agent (200) configured to determine an action so that the sum of rewards obtained from the T steps is maximized based on the episode input by the conditional episode configuration unit (100).

2. The reinforcement learning device of claim 1, wherein the episode configures an end time of the episode through a condition for the state, action, and reward in the T steps, and the end time of the episode is any one of an erroneous prediction, exceeding a specific threshold, and a small reward value of a current step.

3. The reinforcement learning device of claim 1, wherein the conditional episode configuration unit comprises:

a sampling unit (110) configured to extract a plurality of states through sampling from an arbitrary data set;

a condition configuration unit (120) configured to configure a condition in which an episode ends for arbitrary T states among the extracted states, wherein T is less than or equal to the number of extracted plurality of states; and an episode configuration unit (130) configured to configure an episode defined by T steps in which the condition is configured, to define the episode in the condition so that a currently valued range is determined and the episode is flexibly changed when rewards are calculated, to configure a temporary episode based on the episode defined by the T steps in which the condition for terminating the episode is configured to provide the configured temporary episode to the reinforcement learning agent (200), and to automatically define and reconfigure the episode so that, when the episode ends because the condition for the state, action, and reward among the T steps is not satisfied through training of the reinforcement learning agent (200) among the steps of the temporary episode, the sum of the rewards can be maximized based on the step so far where training is performed well by satisfying the condition.

4. The reinforcement learning device of claim 1, wherein the reinforcement learning agent (200) performs reinforcement learning in a direction in which the total sum of the currently valued rewards up to the end time of the episode is maximized.

5. The reinforcement learning device of claim 4, wherein the direction in which the total sum of rewards is maximized is a direction in which a policy gradient for an objective function of reinforcement learning increases cumulative rewards, and is defined by an Equation, $$\nabla_\theta J(\pi) = \sum_{t=0}^{T-1} \nabla_\theta \log \pi(a_t \mid s_t, \theta) \times G(H),$$

where $\nabla_\theta J(\pi)$ denotes the policy gradient, $\pi$ denotes a policy that can give the greatest reward, $\theta$ denotes a coefficient (or a model parameter) of a neural net, T denotes the number of steps for which the condition is configured, $a_t$ denotes an action, $s_t$ denotes a state, and $G(H)$ denotes the total sum of currently valued rewards in one episode.

6. A reinforcement learning method using a conditional episode configuration, the reinforcement learning method comprising:

a) extracting, by a conditional episode configuration unit (100), a plurality of N(≤W) states through sampling from an arbitrary data set in which W units of state exist;

b) configuring, by the conditional episode configuration unit (100), a condition in which an episode ends for arbitrary T(≤N) states among the extracted states;

c) defining, by the conditional episode configuration unit (100), an episode in the condition so that a currently valued range is determined and the episode is flexibly changed when rewards are calculated, and constituting and configuring a temporary episode defined in T steps in which a condition for terminating the episode is configured;

d) performing training, by a reinforcement learning agent (200), to determine an action so that the sum of the rewards obtained in the T steps is maximized based on the configured temporary episode; and e) automatically defining and reconfiguring, by the conditional episode configuration unit (100), the episode so that, when the episode ends because the condition for the state, action, and reward among the T steps is not satisfied through training of the reinforcement learning agent (200), the sum of the rewards can be maximized based on the step so far where training is performed well by satisfying the condition.

7. The reinforcement learning method of claim 6, wherein, in the b) configuring, the conditional episode configuration unit (100) configures any one of an erroneous prediction, exceeding a specific threshold, and a small reward value of a current stage as an end time of the episode through a condition for the state, action, and reward in the T steps.

8. The reinforcement learning method of claim 6, wherein, in the d) performing of the training, the reinforcement learning agent (200) performs training in a direction in which the total sum of the currently valued rewards is maximized until the end time of the episode.

9. The reinforcement learning method of claim 8, wherein the direction in which the total sum of the rewards is maximized is a direction in which a policy gradient for an objective function of reinforcement learning increases cumulative rewards, and is defined by an Equation, $$\nabla_\theta J(\pi) = \sum_{t=0}^{T-1} \nabla_\theta \log \pi(a_t \mid s_t, \theta) \times G(H),$$

where $\nabla_\theta J(\pi)$ denotes the policy gradient, $\pi$ denotes a policy that can give the greatest reward, $\theta$ denotes a coefficient (or a model parameter) of a neural net, T denotes the number of steps for which the condition is configured, $a_t$ denotes an action, $s_t$ denotes a state, and $G(H)$ denotes the total sum of currently valued rewards in one episode.

* * * * *